United States Patent

Ilcisin et al.

Patent Number: 5,694,183
Date of Patent: Dec. 2, 1997

[54] PLASMA ADDRESSED LIQUID CRYSTAL DISPLAY PANEL WITH INTERNAL POLARIZER

[75] Inventors: Kevin J. Ilcisin; Thomas S. Buzak, both of Beaverton, Oreg.; Paul C. Martin, Vancouver, Wash.

[73] Assignee: Tektronix, Inc., Wilsonville, Oreg.

[21] Appl. No.: 803,728

[22] Filed: Feb. 21, 1997

Related U.S. Application Data

[60] Provisional application No. 60/014,683 Apr. 1, 1996.
[51] Int. Cl.$^6$ ............... G02F 1/1335; G09G 3/36
[52] U.S. Cl. .................. 349/32; 349/96; 349/122
[58] Field of Search ................... 349/32, 96, 122, 349/158; 345/60, 87

[56] References Cited

U.S. PATENT DOCUMENTS

| | | | |
|---|---|---|---|
| 5,077,553 | 12/1991 | Buzak | 345/60 |
| 5,499,122 | 3/1996 | Yano | 349/32 |
| 5,519,520 | 5/1996 | Stoller | 349/32 |

FOREIGN PATENT DOCUMENTS 8-263018  10/1996  Japan .

*Primary Examiner*—William L. Sikes
*Assistant Examiner*—Tai V. Duong
*Attorney, Agent, or Firm*—John D. Winkelman; John Smith-Hill

[57] ABSTRACT

A plasma addressed liquid crystal display panel comprises a channel substrate having plasma channels in its upper surface thereof and an upper substrate over the upper surface of the channel substrate. A first polarizer is disposed over the upper surface of the channel substrate and transmits only light that is polarized in a first state. An electro-optic layer extends over the first polarizer and has a first condition in which it transmits light that is polarized in the first state without changing the state of polarization and a second condition in which it converts light that is polarized in the first state to a second state of polarization that is orthogonal to the first state. A second polarizer is over the electro-optic layer and transmits only light that is polarized in the second state. When the electro-optic layer is in the first condition, the second polarizer blocks the light that is transmitted by the first polarizer, whereas when the electro-optic layer is in the second condition, the second polarizer passes the light that is transmitted by the first polarizer.

10 Claims, 1 Drawing Sheet

PLASMA ADDRESSED LIQUID CRYSTAL DISPLAY PANEL WITH INTERNAL POLARIZER

CROSS REFERENCE TO RELATED APPLICATIONS

This application claims the benefit of U.S. Provisional Application No. 60/014,683, filed Apr. 1, 1996.

BACKGROUND OF THE INVENTION

U.S. Pat. No. 5,077,553 discloses apparatus for addressing data storage elements. A practical implementation of the apparatus shown in U.S. Pat. No. 5,077,553 is illustrated schematically in FIG. 3 of the accompanying drawings.

The display panel shown in FIG. 3 comprises, in sequence from below, a polarizer 2, a channel substrate 4, a cover sheet 6 (commonly known as a microsheet), a layer 10 of electro-optic material, an array of parallel transparent data drive electrodes (only one of which, designated 12, can be seen in the view shown in FIG. 3), an upper substrate 14 carrying the data drive electrodes, and an upper polarizer 16. The channel substrate 2 is typically made of glass and is formed with multiple parallel channels 20 in its upper main face. The channels 20 are filled with an ionizable gas, such as helium. A ground electrode and a strobe electrode (not shown) are provided in each of the channels 20. The channels 20 are orthogonal to the data drive electrodes and the region where a data drive electrode crosses a channel (when viewed perpendicularly to the panel) forms a discrete panel element 22. Each panel element can be considered to include elements of the layer 10 and the upper and lower polarizers 2 and 16. In the case of a color display panel, the panel elements include color filters (not shown) between the layer 10 and the upper substrate 14. The region of the upper surface of the display panel that bounds the panel element constitutes a single pixel 24 of the display panel. As explained in U.S. Pat. No. 5,077,553, when a suitable potential difference is established between the strobe and ground electrodes in one of the channels, the gas in that channel forms a plasma that provides a conductive path at the lower surface of the cover sheet 6. If the data drive electrode is at ground potential, there is no significant electric field in the volume element of electro-optic material and the pixel is considered to be off, whereas if the data drive electrode is at a substantially different potential from ground, there is a substantial electric field in that volume element of electrooptic material and the pixel is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material is a twisted nematic liquid crystal material that rotates the plane of polarization of linearly polarized light passing therethrough by an angle that is a function of the electric field in the liquid crystal material. When the pixel is off, the angle of rotation is 90°; and when the pixel is on, the angle of rotation is zero.

The panel is illuminated from the underside by an extended light source (not shown) that emits unpolarized white light. A rear glass diffuser 18 having a scattering surface may be provided between the light source and the panel in order to provide uniform illumination of the panel. The light from the source is linearly polarized at 0° by the lower polarizer 2 and passes sequentially through the channel substrate 4, the channels 20, the cover sheet 6, and a volume element of the liquid crystal material toward the upper polarizer 16 and a viewer 26. If a given pixel is off, the plane of polarization of linearly polarized light passing through the volume element of liquid crystal material is rotated through 90°, and therefore the plane of polarization of light incident on the upper polarizer element is at 90°. The light is passed by the upper polarizer element and the pixel is illuminated. If, on the other hand, the pixel is on, the plane of polarization of the linearly polarized light is not changed on passing through the volume element of liquid crystal material. The plane of polarization of light incident on the upper polarizer element is at 0° and therefore the light is blocked by the upper polarizer element and the pixel is dark. If the electric field in the volume element of liquid crystal material is intermediate the values associated with the pixel being off and on, light is passed by the upper polarizer element with an intensity, that depends on the electric field, allowing a gray scale to be displayed.

In order to obtain an optimum display, light must be efficiently blocked when a pixel is on and it must be efficiently transmitted when a pixel is off, so as to maximize contrast between a pixel that is off and a pixel that is on. This necessitates that the light incident on the layer 10 be linearly polarized at 0°. This in turn requires that there should be no change in polarization of the light passing from the lower polarizer 2 to the layer 10. This requirement imposes stringent requirements on manufacture of the channel substrate and the cover sheet. For example, it is important that the surface that bounds the channel be as smooth as possible so the light entering the channel from the channel substrate is not scattered, since scattering depolarizes light. Further, even if the channel surface is optically perfect, when linearly polarized light passes at oblique incidence through an interface at which there is a change in refractive index, the plane of polarization of the light is rotated and therefore even if linear polarization is preserved, some of the light is polarized at angles other than 0°. This problem can be reduced somewhat by adjusting the cross-sectional shape of the channel, but a technique that allows a high quality channel surface to be achieved is not necessarily able to accommodate a desired channel geometry.

Choices made in order to optimize the propagation of light through the channel substrate and the cover sheet have an impact on other aspects of the construction and operation of the display panel. For example, the cover sheet must be transparent in order to avoid scattering and thereby depolarizing the linearly polarized light. Glass has favorable optical properties but is not the optimum material for the cover sheet with regard to electrical properties. Thus, when a pixel is in the on state, the potential difference between the data drive electrode and ground is distributed between the layer 8 of electrooptic material and the cover sheet 6 approximately in accordance with the reciprocal of the capacitance per unit area of the respective elements, and in order to minimize the drive voltage, and thereby minimize power dissipation, the capacitance per unit area of the cover sheet must be as large as possible. This implies that the dielectric constant of the material employed for the cover sheet should be as large as possible. Glass typically has a dielectric constant in the range from about 3 to 10, but there are other non-opaque materials, such as barium titanate, that have a much larger dielectric constant than glass. However, barium titanate is translucent, not transparent, and therefore is excluded from the range of materials that are suitable for the cover sheet. Accordingly, it is necessary to accept the disadvantages that attend use of a relatively high drive voltage.

SUMMARY OF THE INVENTION

In accordance with the present invention there is provided a plasma addressed liquid crystal display panel comprising a channel substrate having plasma channels in an upper surface thereof, an upper substrate over the upper surface of the channel substrate, a first polarizer over the upper surface of the channel substrate, the first polarizer transmitting only light that is polarized substantially in a first state, an electro-optic layer over the first polarizer, the electro-optic layer having at least a first condition in which it transmits light that is polarized in said first state without changing the state of polarization and a second condition in which it converts light that is polarized in said first state to a second state of polarization that is orthogonal to said first state, and a second polarizer over the electro-optic layer, said second polarizer transmitting only light that is polarized substantially in one of said first and second states.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numeral designate corresponding components.

In the description and claims, words of orientation and position, such as upper and lower, are used to establish orientation relative to the drawings and are not intended to be limiting in an absolute sense. Thus, a surface that is described as upper in the specification may correspond, in a practical implementation of the invention, to a lower surface or a vertical surface, which is neither upper nor lower.

DETAILED DESCRIPTION

Figure 1:
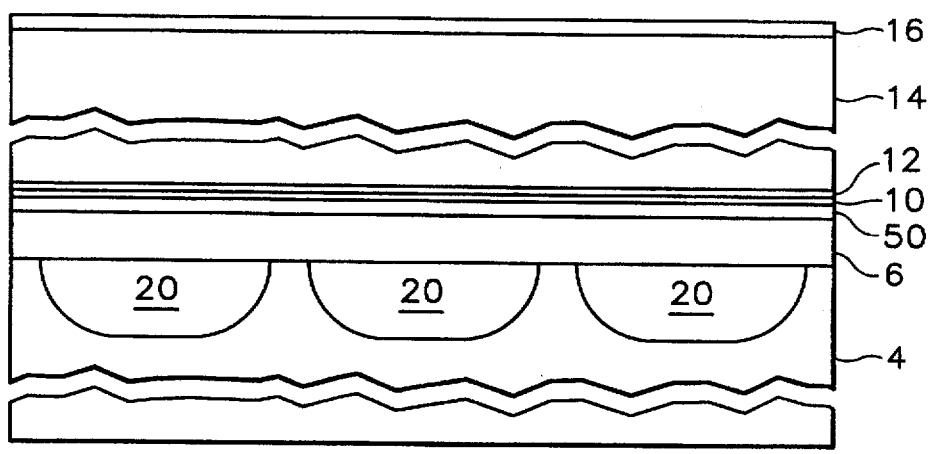
FIG. 1 is a schematic partial sectional view of a first plasma addressed liquid crystal display panel in accordance with the present invention.
Figure 3:
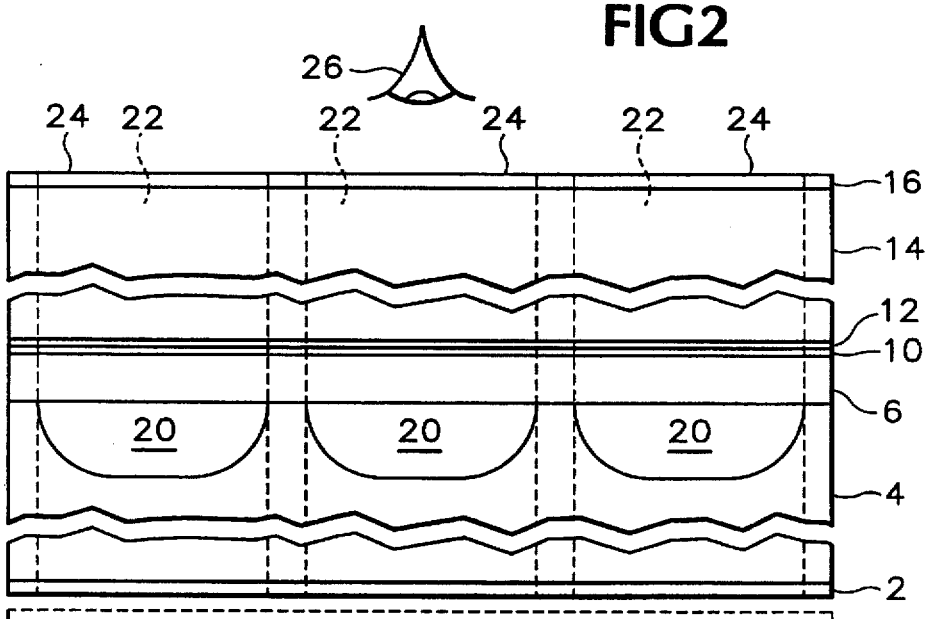
FIG. 3 is a schematic partial sectional view of a plasma addressed liquid crystal display panel in accordance with the prior art.

The display panel shown in FIG. 1 comprises a linear polarizer 50 between the cover sheet 6 and the layer 10 of liquid crystal material. The polarizer 50 is provided in lieu of the polarizer 2 of FIG. 3. The polarizer 50 is typically a sheet of stretched polyvinyl alcohol. The top surface of the polarizer 50 is treated to provide an alignment surface, and the layer of liquid crystal material is deposited over the alignment surface. The upper substrate 14, with the data drive electrodes attached thereto, is secured in position over the layer 8 of liquid crystal material, as in the case of FIG. 3.

Providing the polarizer 50 downstream of the channel substrate 4 and the cover sheet 6 improves the optical performance of the panel in several ways. First, the light entering the channel substrate from the light source is unpolarized, and therefore there is change in polarization on passing through an interface between media of different refractive index. Further, since the light entering the channel substrate is unpolarized, scattering at the substrate/gas interface does not impair the contrast ratio, and accordingly, the optical quality of the channel surfaces need not reach such high standards as in the case of the panel shown in FIG. 3. The geometry of the channel surfaces does not affect the contrast ratio.

Further, it is not necessary that the cover sheet 6 meet such high optical standards, and scattering in the cover sheet can be tolerated. The cover sheet may have a scattering upper surface that diffuses the light being transmitted to the polarizer 50, avoiding the need for a rear glass diffuser and thereby reducing the cost of the panel. Since scattering in the cover sheet can be tolerated, a material that is translucent, not transparent, but has a higher dielectric constant than glass can be used for the cover sheet. For example, the cover sheet can be made of barium titanate.

It will be appreciated that for a given drive voltage, the electric field in the layer 8 is increased not only by increasing the dielectric constant of the material employed for the cover sheet but also by decreasing the thickness of the cover sheet. As noted previously, the dielectric constant of glass is typically in the range from about 3 to 10. A glass cover sheet should be at least 10 μm thick in order to withstand handling in assembly of the display panel. Certain translucent synthetic polymer materials can be manufactured in sheet form with a thickness considerably less than 10 μm and still be sufficiently tough to withstand handling. Even though such materials may have a lower dielectric constant than glass, e.g. in the range from about 2 to about 4, the increase in capacitance per unit area due to the reduction in thickness may more than offset the decrease due to the reduction in dielectric constant.

Figure 2:
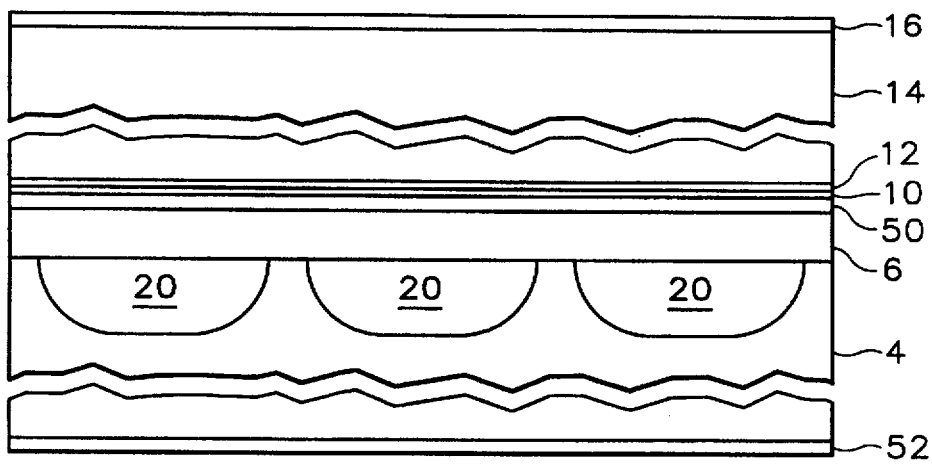
FIG. 2 is a schematic partial sectional view of a second plasma addressed liquid crystal display panel in accordance with the present invention.

The display panel shown in FIG. 2 differs from that shown in FIG. 1 insofar as is includes a polarizer 52 below the channel substrate, in addition to the polarizer 50 between the cover sheet and the liquid crystal layer. The plane of polarization of the polarizer 52 is at 0°. The polarizer 52 is provided in the event that the polarizer 50 is unable to polarize the light that it receives to a sufficient degree. Thus, the light entering the channel substrate 4 is linearly polarized at 0° but it is subject to rotation and depolarization before reaching the polarizer 50. The polarizer 50 then serves to restore the polarization of the light supplied to the liquid crystal layer 8.

It will be appreciated that the invention is not restricted to the particular embodiments that have been described, and that variations may be made therein without departing from the scope of the invention as defined in the appended claims and equivalents thereof. For example, although the embodiments shown in FIGS. 1 and 2 each include a cover sheet 6 in addition to the internal polarizer 50, by selection of appropriate materials the function of the cover sheet may be assumed by the internal polarizer, avoiding the need for a separate cover sheet. Further, although the invention has been described with reference to linear polarizers, it will be understood by a person skilled in the art that the same principles are applicable to circularly polarized light.

We claim:

1. A plasma addressed liquid crystal display panel comprising:

a channel substrate having plasma channels in an upper surface thereof, an upper substrate over the upper surface of the channel substrate, a first polarizer over the upper surface of the channel substrate, the first polarizer transmitting only light that is polarized substantially in a first state, an electro-optic layer over the first polarizer, the electro-optic layer having at least a first condition in which it transmits light that is polarized in said first state without changing the state of polarization and a second condition in which it converts light that is polarized in said first state to a second state of polarization that is orthogonal to said first state, and a second polarizer over the electro-optic layer, said second polarizer transmitting only light that is polarized substantially in one of said first and second states.

2. A display panel according to claim 1, further comprising a cover sheet between the channel substrate and the first polarizer.

3. A display panel according to claim 2, wherein the cover sheet is made of glass.

4. A display panel according to claim 2, wherein the cover sheet is made of a material having a substantially higher dielectric constant than glass.

5. A display panel according to claim 2, wherein the cover sheet is made of a translucent synthetic polymer material and has a thickness less than 10 μm.

6. A display panel according to claim 2, wherein the cover sheet is translucent.

7. A display panel according to claim 2, wherein the cover sheet is made of barium titanate.

8. A display panel according to claim 1, further comprising a third polarizer that is disposed below the channel substrate and transmits only light that is polarized substantially in said first state.

9. A display panel according to claim 1, wherein the second polarizer transmits only light that is polarized substantially in said second state.

10. A display panel according to claim 1, wherein the electro-optic layer has a continuum of intermediate conditions between the first condition and the second condition.

* * * * *